United States Patent
Nelson et al.

[11] Patent Number: 5,937,198
[45] Date of Patent: Aug. 10, 1999

[54] FIELD CONFIGURABLE EMBEDDED COMPUTER SYSTEM

[75] Inventors: Eric L. Nelson; Michael L. Evans; Lance N. Shelton, all of Boise; Jared C. Roundy, Meridian, all of Id.

[73] Assignee: Extended Systems, Inc., Boise, Id.

[21] Appl. No.: 09/132,846

[22] Filed: Aug. 12, 1998

Related U.S. Application Data

[63] Continuation of application No. 08/704,434, Aug. 28, 1996, Pat. No. 5,812,857.

[51] Int. Cl.⁶ ........................................................ G06F 9/06
[52] U.S. Cl. ................................ 395/712; 713/1; 709/302
[58] Field of Search ...................... 395/712, 651, 395/652, 653, 200.5, 200.51, 200.52; 713/1, 2, 100; 709/220, 221, 222, 301, 302

[56] References Cited

U.S. PATENT DOCUMENTS

| | | | |
|---|---|---|---|
| 5,247,683 | 9/1993 | Holmes et al. | 395/712 |
| 5,603,056 | 2/1997 | Totani | 395/681 |
| 5,623,618 | 4/1997 | Brewer et al. | 395/681 |
| 5,815,707 | 9/1998 | Krause et al. | 395/681 |

*Primary Examiner*—Kevin A. Kriess
*Attorney, Agent, or Firm*—Robert A. Huntsman

[57] ABSTRACT

An apparatus and method for downloading firmware upgrades to a targeted remote field configurable embedded computer system over a computer network. The targeted device need not be disconnected from the network and requires no human intervention at the remote site. The entire firmware, including the downloading mechanism, can be updated in an efficient manner.

11 Claims, 12 Drawing Sheets

FIELD CONFIGURABLE EMBEDDED COMPUTER SYSTEM

CROSS REFERENCE TO RELATED APPLICATIONS

This application is a continuation of application Ser. No. 08/704,434 filed Aug. 28, 1996, now U.S. Pat. No. 5,812,857.

BACKGROUND

Modern computer systems typically consist of a number of different computers and computer peripherals interconnected by a network. Computer networking is a rapidly changing technology, making it challenging for vendors to keep the technology of computer related products current with computer networking technology. Products need to be updated frequently for at least two reasons, namely, to adapt to additional networking topologies, and to provide new features demanded by the marketplace.

To meet the demand for rapidly changing computer products, field configurable embedded computer systems were introduced. A field configurable embedded computer system consists of a small computer system included in a consumer or business product. A field configurable embedded computer system typically contains a central processing unit, a persistent memory area for storing programs and persistent variables that need to be preserved when the product is powered down, a volatile memory area that is operational while the unit containing the field configurable embedded computer system is powered on, but is erased when the unit is powered off, and a network communications hardware means, including the associated software drivers that enable the device to connect to a computer network.

Field configurable embedded computer systems are used to build a family of products. Each product in the family uses the same field configurable computer system hardware. The family members differ from each other in the feature functions they provide. The feature functions for a particular family member are implemented in computer software. Thus by changing the software, a product can be changed from one family member to another.

A field configurable embedded computer systems is said to be configured as a particular family member when the appropriate software for that family member has been installed in the field configurable embedded computer system. The computer software is installed on a particular field configurable embedded computer system by transferring a copy of the software from a master computer to that particular field embedded computer system. The process of transferring computer software from a master computer to a particular field configurable embedded computer systems is known as downloading.

Downloading can take place over a computer network such as the internet. Thus the master computer can be at the manufacturer's factory, and the field configurable embedded computer system can be simultaneously installed at a remote customer site. More commonly, the new download code set is transferred to the customer via the internet or other means, and a customer computer is used as the master computer. If the master computer and the field configurable embedded computer system are connected to the same network such as the internet or a company private network, then a download can take place from the master computer to the unit while it remains installed in the customer site as long as the download code is operational in the device. This is very convenient because the customer does not have to return the product to the factory for an upgrade or even shut it off or disconnect it from the network. In extreme cases, downloading is used to totally reconfigure a field configure embedded computer system from one family member to a completely different family member, effectively swapping products.

Field configurable embedded computer systems operate in two basic modes. The first mode is the product's normal operating mode where it functions as a useful product. The second mode is a download mode where the product in the field is poised to receive new computer code from a master computer at the factory by means of a download over the network. After the download is complete, the product is then returned to its normal operating mode.

Unfortunately, in traditional field configurable embedded computer systems the download program code section of the persistent memory area tends to be large because multiple networking environments utilized by various family members of the product line need to be supported. This results in at least three problems. The first problem is that although the product family generally supports a large number of different networking environments, a particular family member only needs to support a single networking environment. The remaining network drivers in the download network driver sections are ineffective, wasting code space in the program download code section that could be better used to provide additional feature functions. The second problem is that the download network driver section is largely redundant with the feature network driver section, because both provide a means to communicate with supported computer networks. This inefficient use of the persistent memory area leaves less room in the persistent memory area for feature functions. A third problem with existing field configurable embedded computer systems is that since only the feature code section can be reconfigured by a download, the download program code section itself cannot be upgraded.

Updating feature code from one computer from another computer is well known. U.S. Pat. No. 5,142,680 to Ottman (the '680 patent) teaches how to upgrade an operating system from one computer to another. U.S. Pat. No. 5,261,055 to Moran (the '055 patent) teaches of a generalized scheme to update computer code using a separate, dedicated processor for the download functions. U.S. Pat. No. 5,404,450 to Szczepanak (the '450 patent) teaches how to load new networking protocols on computers on a network. U.S. Pat. Nos. 5,261,114 and 5,408,624 to Raasch (the Raasch patents) teach of a method of updating code using the ISA bus instead of a network. U.S. Pat. No. 5,239,621 to Brown (the '621 patent) teaches of a variation of a field configurable embedded computer system where the feature function are fonts and macros for a printer. U.S. Pat. No. 5,402,528 to Christopher (the '528 patent) teaches how to update specific printer functions by partitioning memory into two sections and only the second can be upgraded.

Although the above cited patents teach various methods of updating one computer from another computer, none teach any specific methodology to update the downloading mechanism itself. The '680 is directed toward large computers rather than embedded computers, and the core downloading means taught by the '680 patent must be loaded on to the transferee from a source other than the transferror computer, providing no way to update the download means itself. The '621 patent uses the existing datastream to perform the download, thus the downloading mechanism itself cannot be altered in the field. The '055 patent uses a separate, dedicated and permanent downloading means. The '450 patent does not provide a way to change the downloading protocol itself; in fact the downloading mechanism is protected from change in the '450 teachings. The Raasch patents do not provide a means for updating the download code itself; furthermore the Raasch teachings are not readily applicable to a networking environment and are directed devices contained within a single computer. The '528 patent does not teach how to update the download mechanism itself, and it provides no means to upgrade the first memory section.

The ESI 2830 Pocket Printer server (the '2830) is similar to the '528 patent in that it provides two distinct memory sections; one for downloading code and another for features functions for the print server. The '2830 is an improvement over the '528 patent in that unlike the '528 patent, both memory sections can be updated by a download. However, the '2830 scheme requires dedicated networking code in its downloading means separate from, and redundant with, large amounts of networking code in the feature functions of the second memory section, thus severely limiting the features of the product.

What is needed is a field configurable embedded computer system that both eliminates redundant network driver code and allows new network driver code, including the download code, to be downloaded.

SUMMARY OF THE INVENTION

The present invention replaces both the download network driver section and the feature network driver section with a single combined network driver section, thus eliminating redundant network drivers. The present invention allows the download program code itself to be updated during a download, by dividing the download code set into different sections and using both persistent memory and volatile memory in a novel way.

Accordingly, it is an object of the present invention to provide a single set of network driver code for both downloading purposes and implementation of feature functions. It is a further object of the present invention to provide a means to download new download code, including new network drivers, to a field configurable embedded computer system installed at a customer site in the field. It is a further object of the present invention to minimize the amount of time critical code is executing out of volatile memory thus minimizing the likelihood of a catastrophic failure during download that would require factory repair.

DETAILED DESCRIPTION OF THE INVENTION

Figure 1:
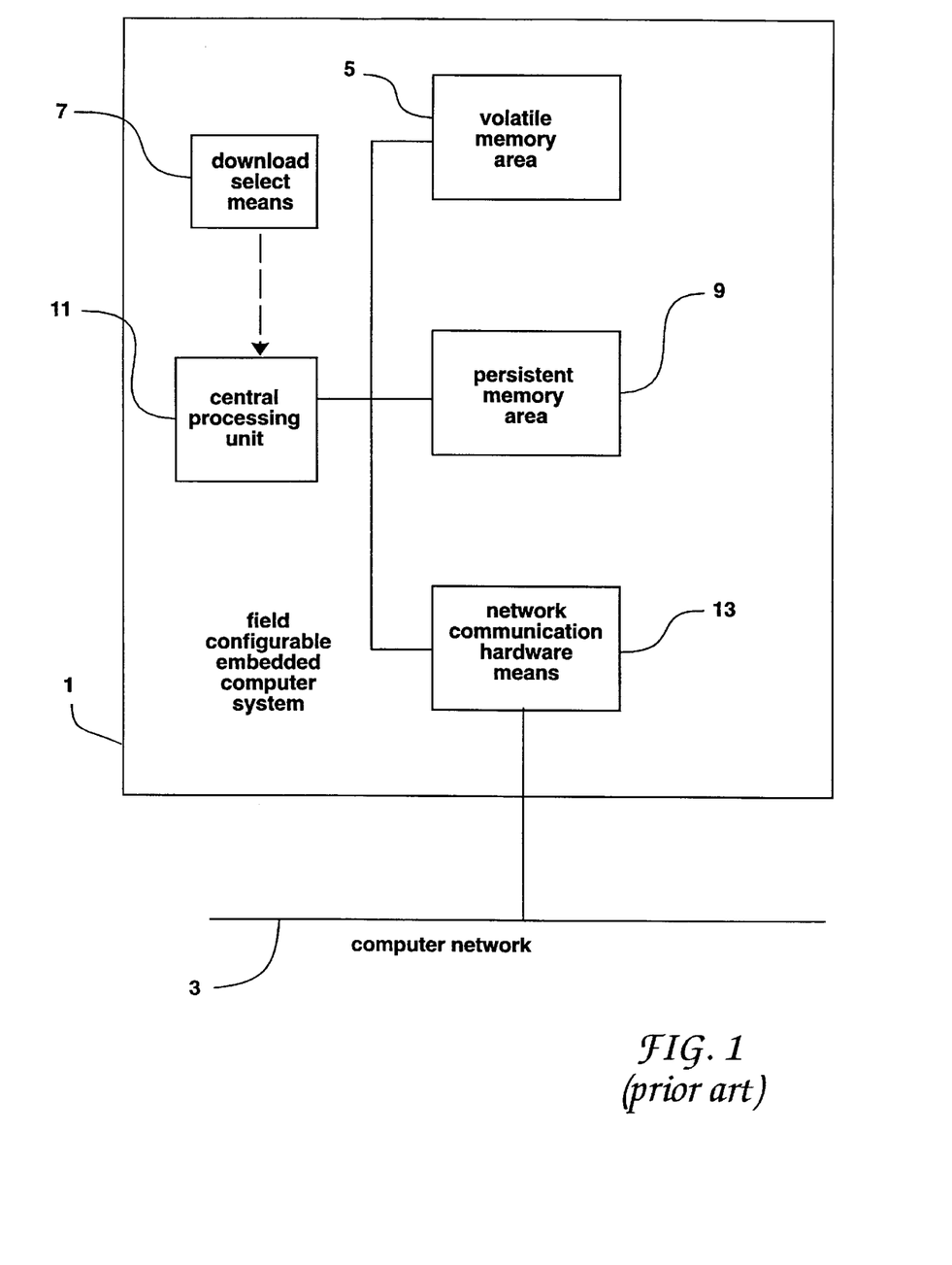
FIG. 1 is a block diagram of a prior-art field configurable embedded computer system.

FIG. 1 shows a traditional field configurable embedded computer system 1 containing a central processing unit 11, a persistent memory area 9 for storing programs and persistent variables that need to be preserved when the product is powered down, a volatile memory area 5, typically implemented as RAM that is operational while the unit containing the field configurable embedded computer system 1 is powered on, but is erased when the unit is powered off, and a network communications hardware means 13, including the associated software drivers that enable the device to connect to a computer network 3. The download select means typically is a switch either in hardware or software that enables the device to function in either its normal operating mode, or, alternatively, in download mode.

Figure 2:
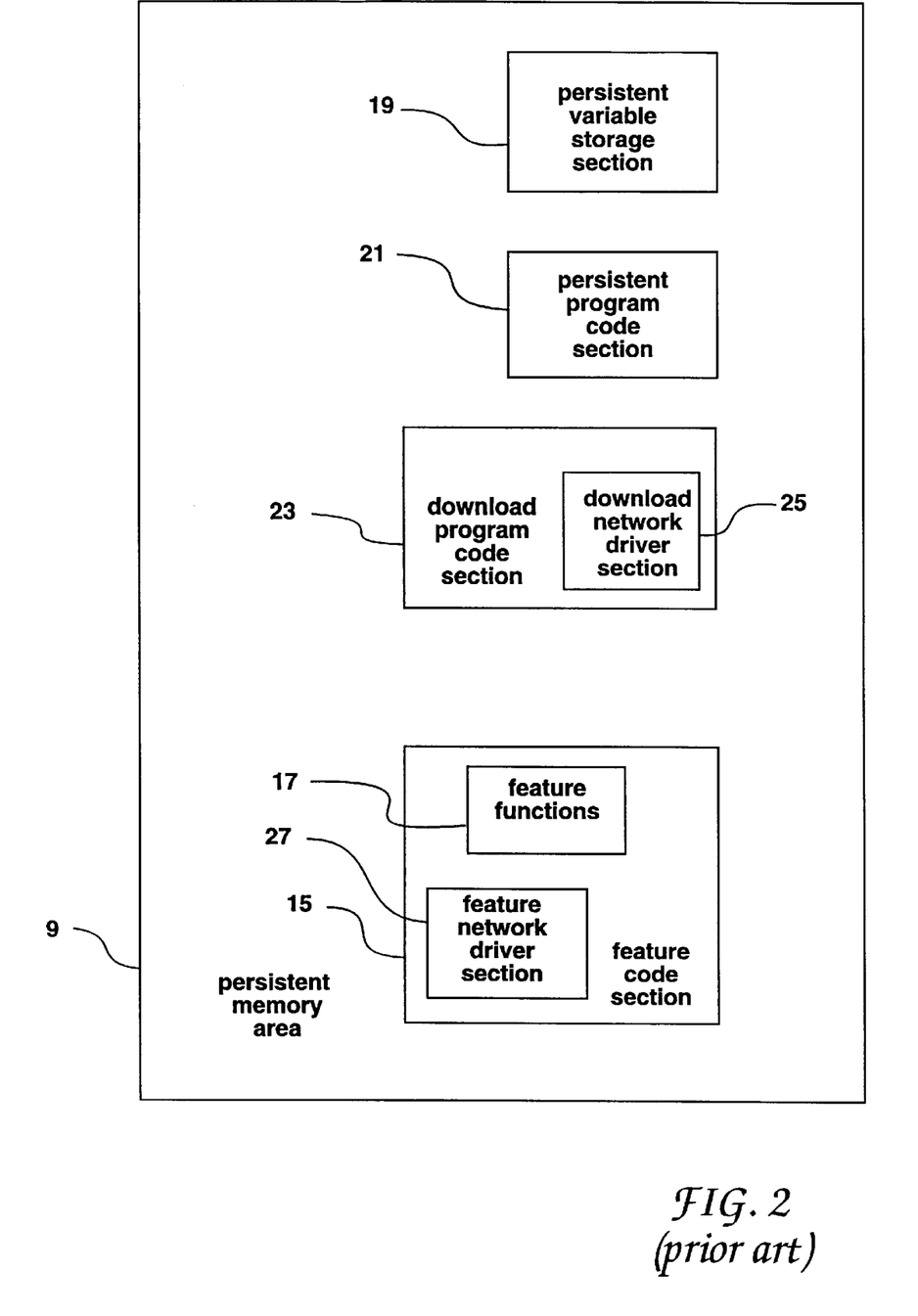
FIG. 2 is an expanded block diagram of the persistent memory area according to the prior art.

FIG. 2 show how the persistent memory area 9 is traditionally arranged. The traditional arrangement includes a persistent program code section 21 that contains computer code for the operation of the device; the code is executed by the central processing unit 11 of FIG. 1. The traditional arrangement also includes a persistent variable storage section 19 that includes variables that do not change during normal operation of the device and can include things like network hardware addresses, textual string constants and text messages. The traditional arrangement of FIG. 2 also includes a feature code section 15 that contains the operating code for the device and typically includes feature functions 17 and a feature network driver section 27 that contains support code and functionality for the feature functions 17.

The traditional field configurable embedded computer system of FIG. 2 suffers from redundant network drivers sections. Specifically, the download network driver section 25 and the feature network driver section 27 are redundant in that they both provide network support, but in a different context. The download network driver section 25 typically operates only when the device is selected to operate in download mode. The feature network driver section 27 only operates when the device is operating in it normal operating mode.

Figure 3:
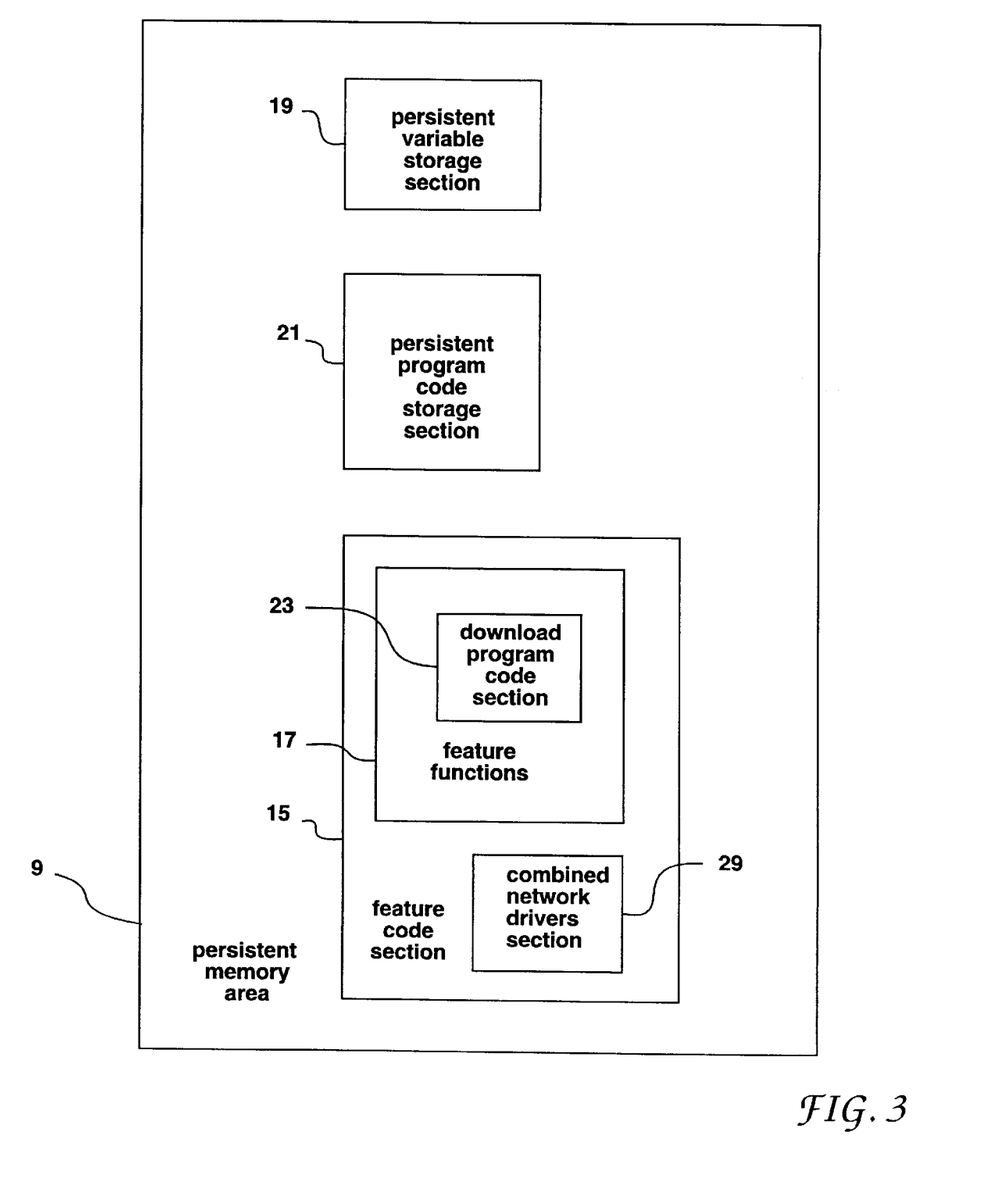
FIG. 3 is an expanded block diagram of the persistent memory area according to the present invention.

The present invention improves this arrangement as shown in FIG. 3. In the present invention, the download program section 23 is implemented as a part of the feature functions 17. The download network driver section 25 and the feature network driver section 27 are replaced by a single new combined network driver section 29, thus allowing both the traditional features and the download code to use and share the same network drivers contained in the feature network driver section 27, thus eliminating the need for an independent download program code section and its associated download network driver section 25, allowing more memory in the feature code section 15 for feature functions 17.

The optimal memory arrangement is depicted in FIG. 3. The ability to download a new downloader, arising from the novel downloading method of the present invention, is illustrated in FIG. 4 through FIG. 12.

Figure 4:
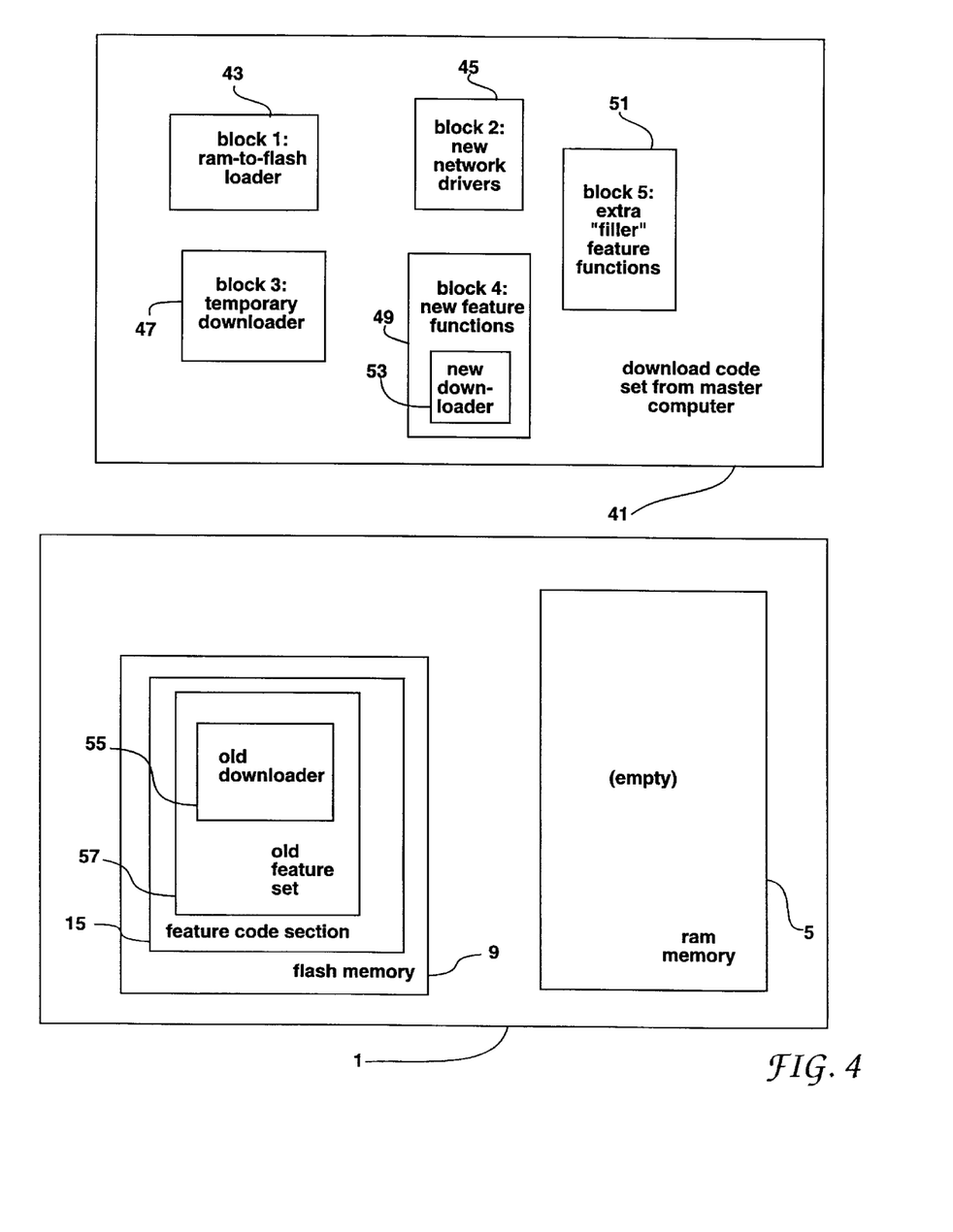
FIG. 4 is a block diagram showing the blocks of memory that comprise a download code set and that exist in a field configurable embedded computer system just prior to a download according to the present invention.

FIG. 4 through FIG. 12 illustrate steps that move computer code from a master computer to field configurable embedded computer system 1 during a download. Referring to FIG. 4, initially a master copy of the new download code set 41 is stored in a master computer (not shown). The new download code set 41 is typically a single computer file, however, when practicing the current invention, the code is segmented up into either four or five distinguishable blocks as shown in FIG. 4. The blocks are a ram-to-flash loader 43, new network drivers 45, a temporary downloader 47, new feature functions 49. A fifth optional block is extra feature functions 51 that can be loaded with an extra step if desired as discussed below.

FIG. 4 shows the location of the code blocks prior to the execution of the downloading process. Initially, the field embedded computer system 1 contains a feature code section 15 having an old feature set 57 including old downloader 55 in flash memory 9 which are replaced by the downloading process.

Figure 5:
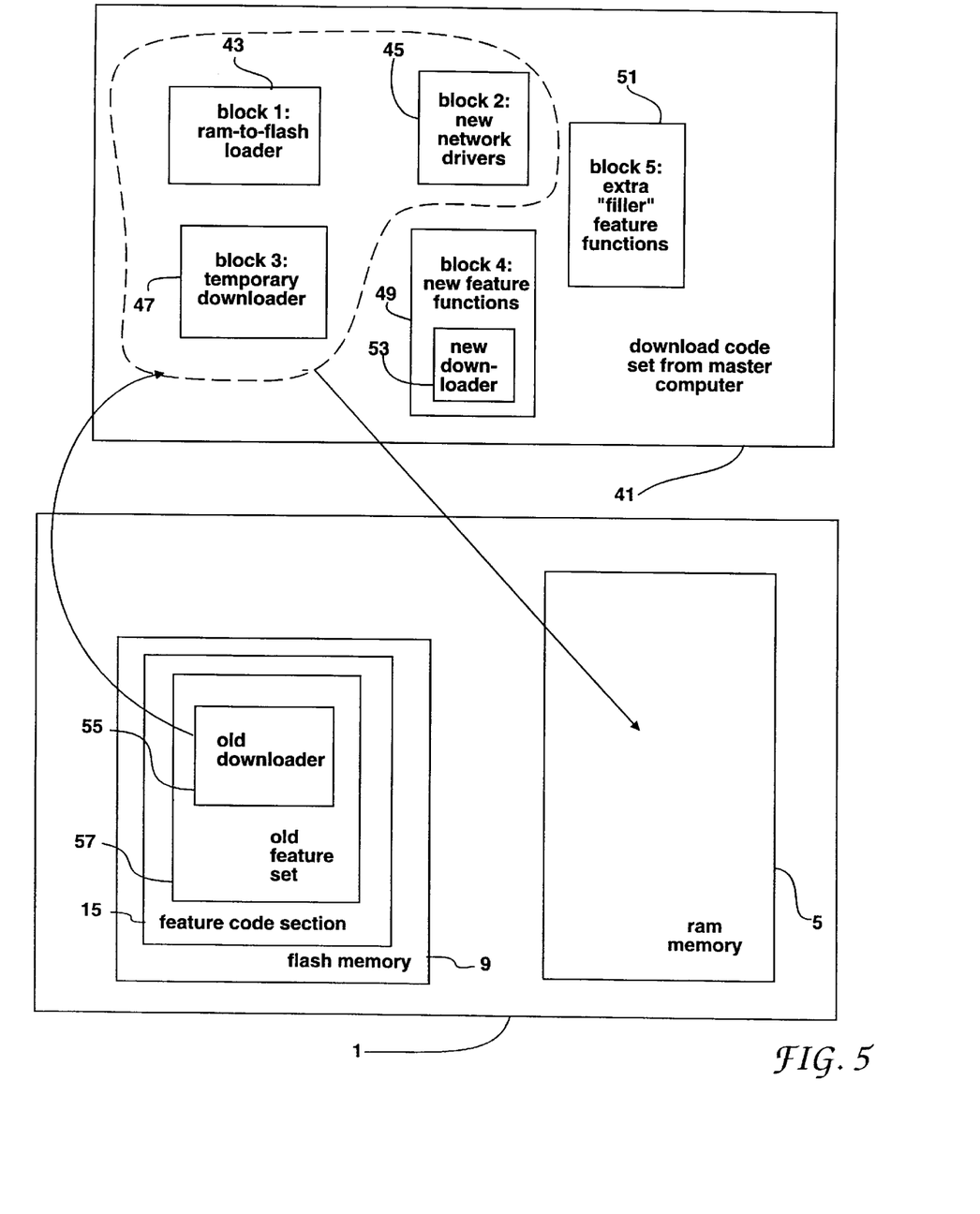
FIG. 5 is a block diagram showing the location of the code blocks involved in the first step of the download method of the present invention.

Downloading is initiated by engaging the download select means 7 of FIG. 1 to select download. First, the old downloader 55 copies the ram-to-flash loader 43, the new network drivers 45 and the temporary downloader 47 to ram memory 5 as shown in FIG. 5.

Figure 6:
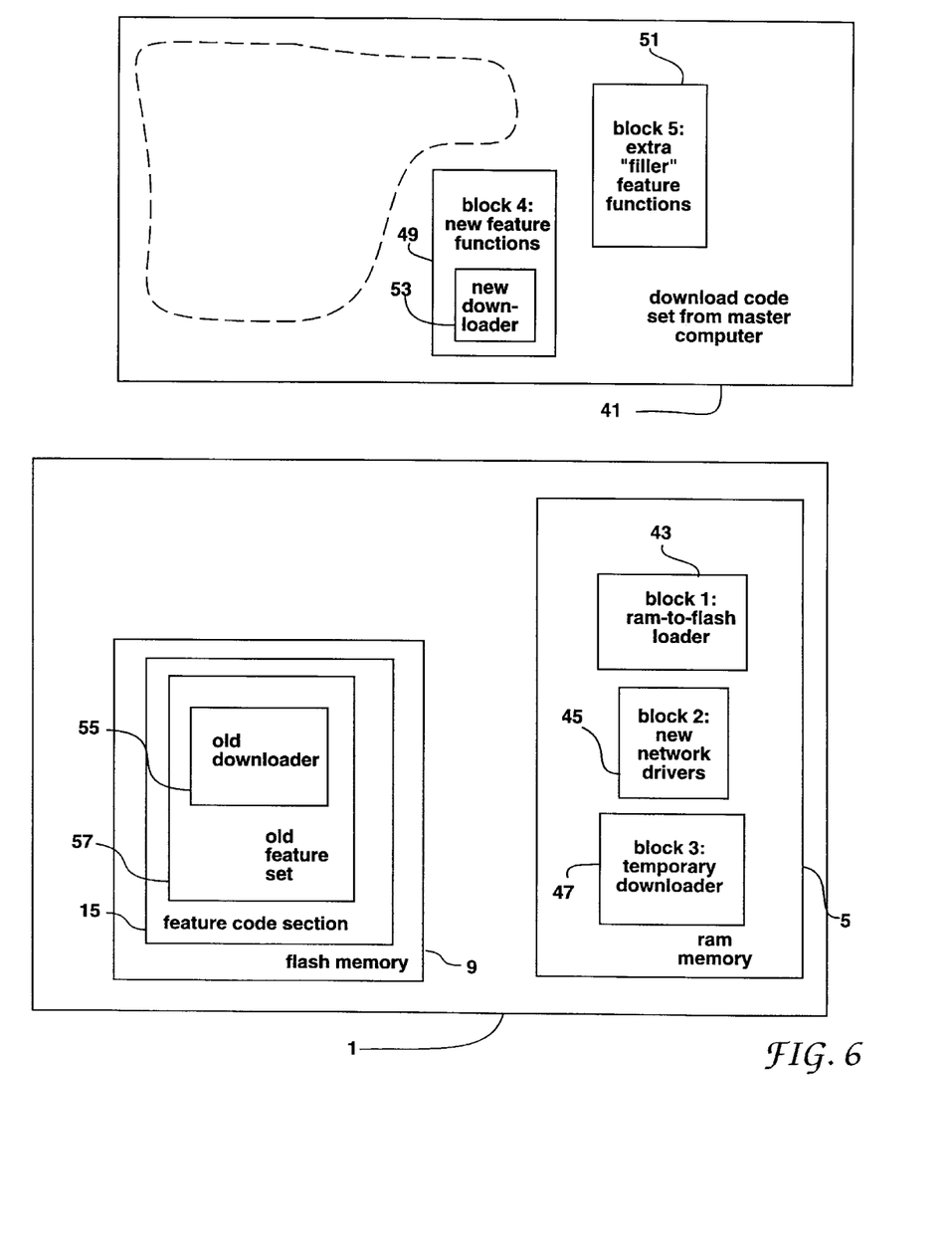
FIG. 6 is a block diagram showing the location of code blocks after completion of the first step of the download method of the present invention.
Figure 7:
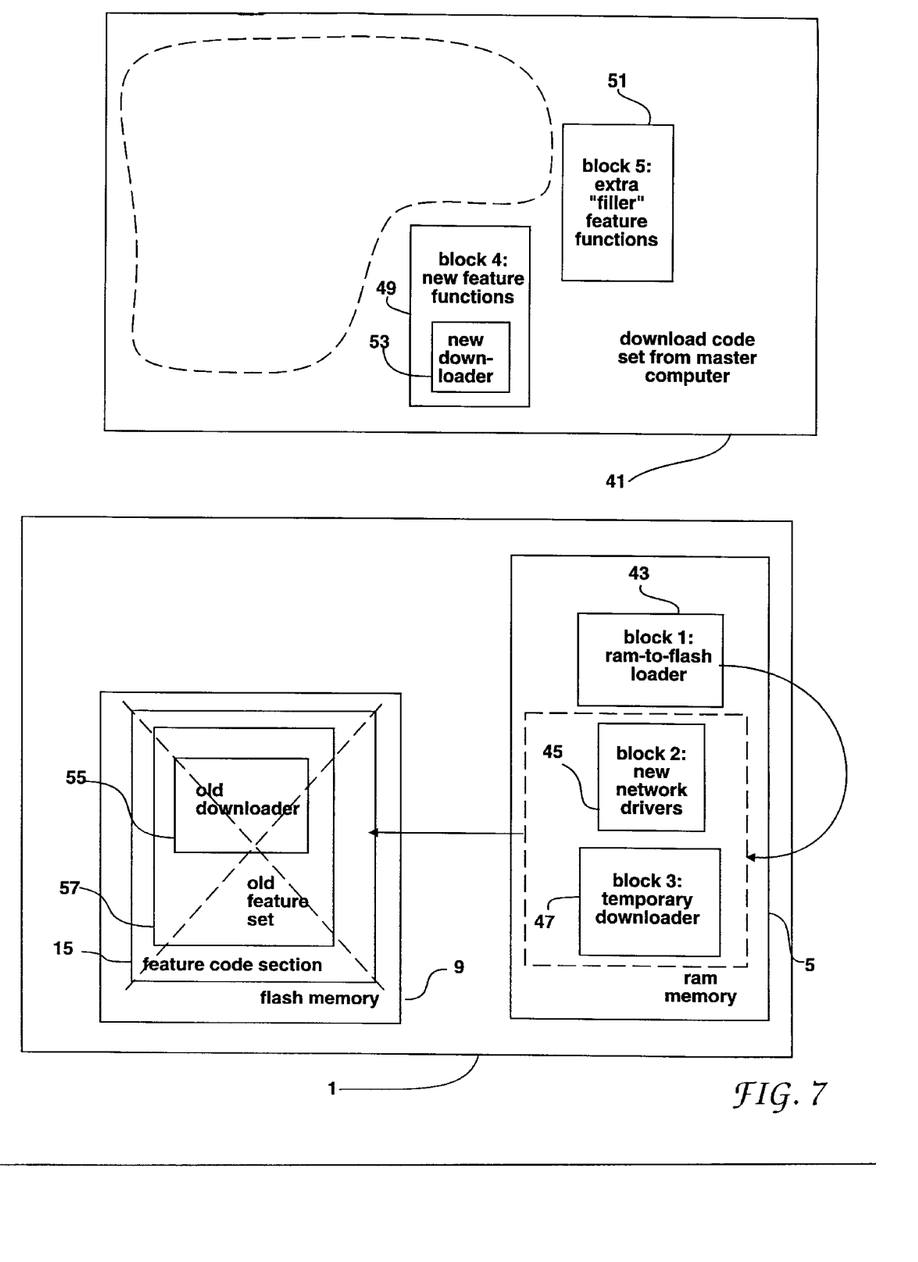
FIG. 7 is a block diagram showing the location of the code blocks involved in the second step of the download method of the present invention.
Figure 8:
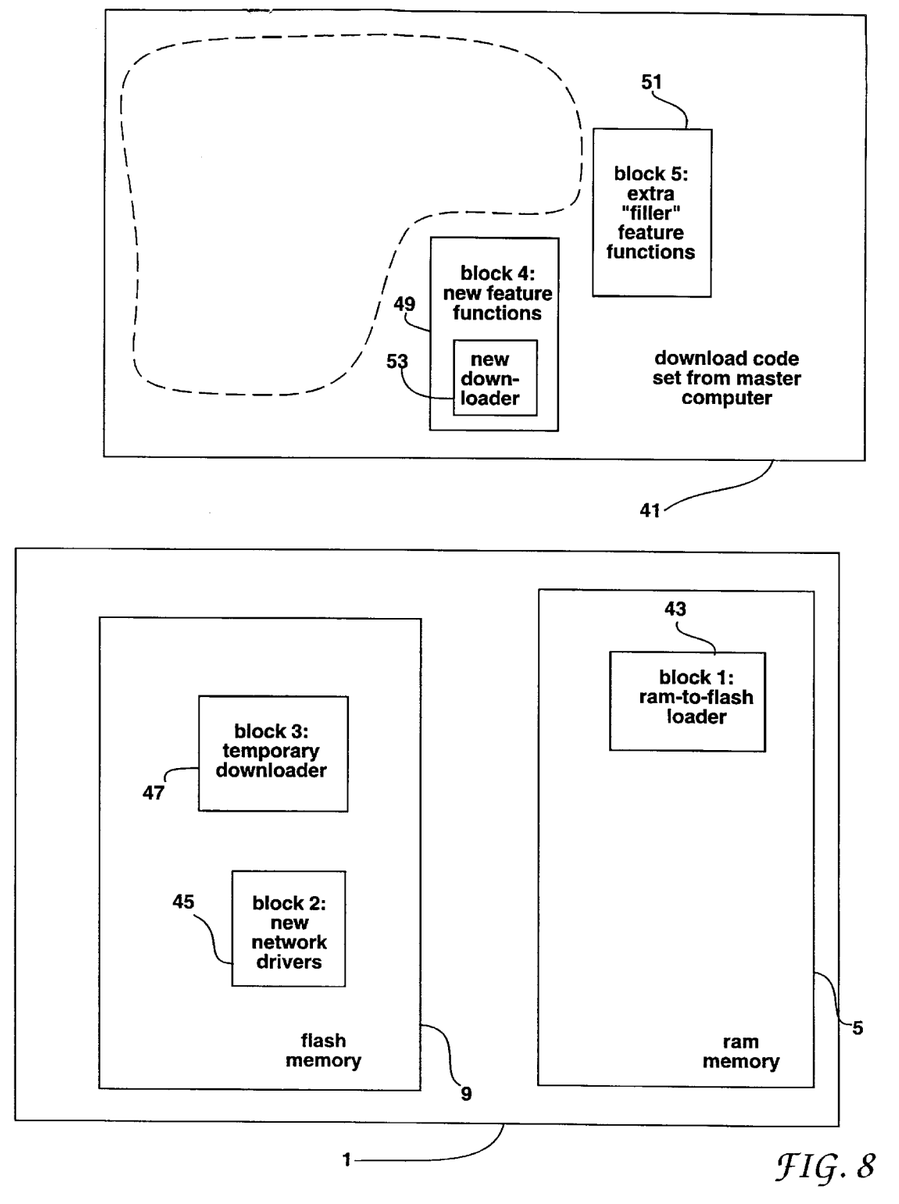
FIG. 8 is a block diagram showing the location of code blocks after completion of the second step of the download method of the present invention.
Figure 9:
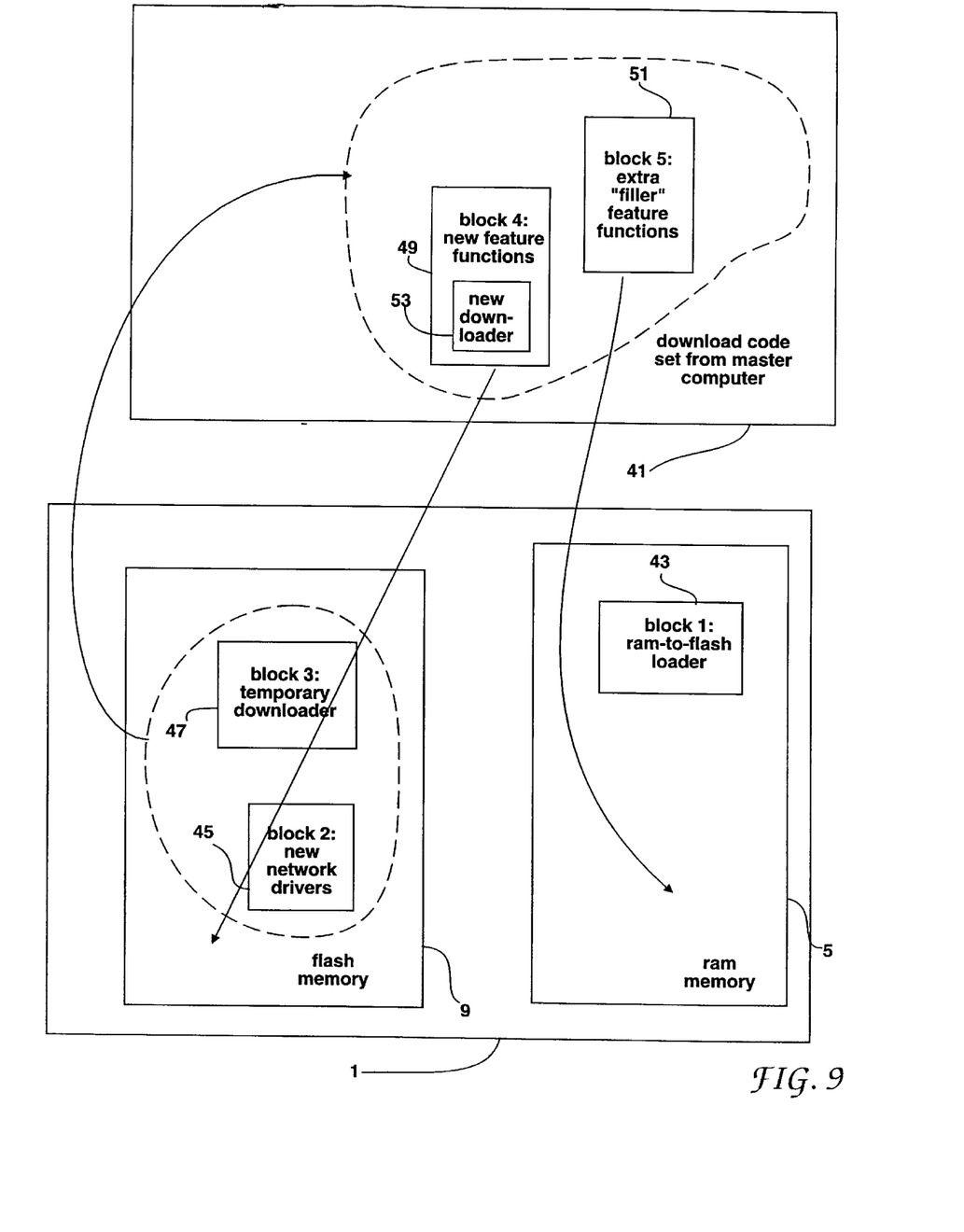
FIG. 9 is a block diagram showing the location of the code blocks involved in the third step of the download method of the present invention.
Figure 10:
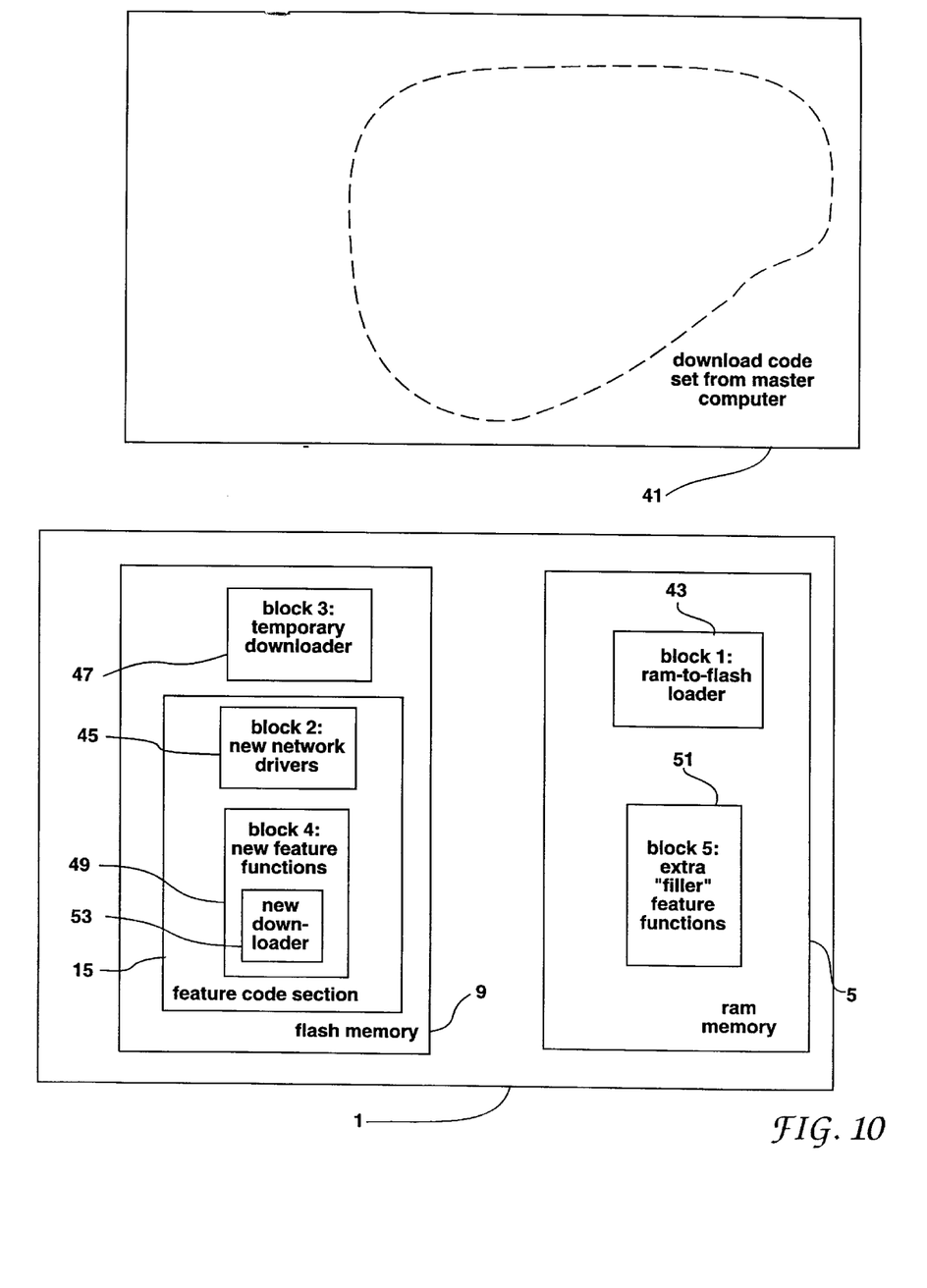
FIG. 10 is a block diagram showing the location of code blocks after completion of the third step of the download method of the present invention.
Figure 11:
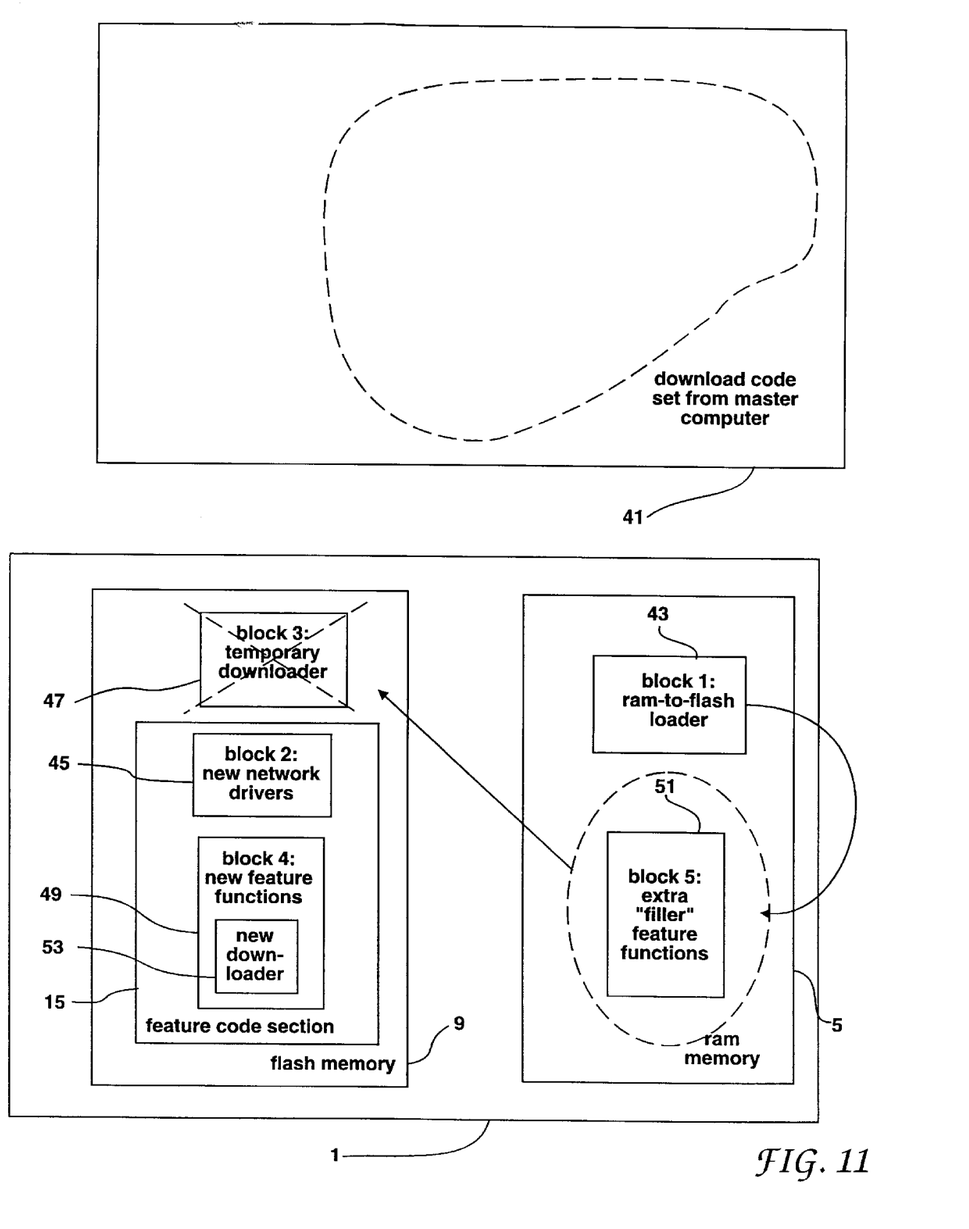
FIG. 11 is a block diagram showing the location of the code blocks involved in the optional fourth step of the download method of the present invention.
Figure 12:
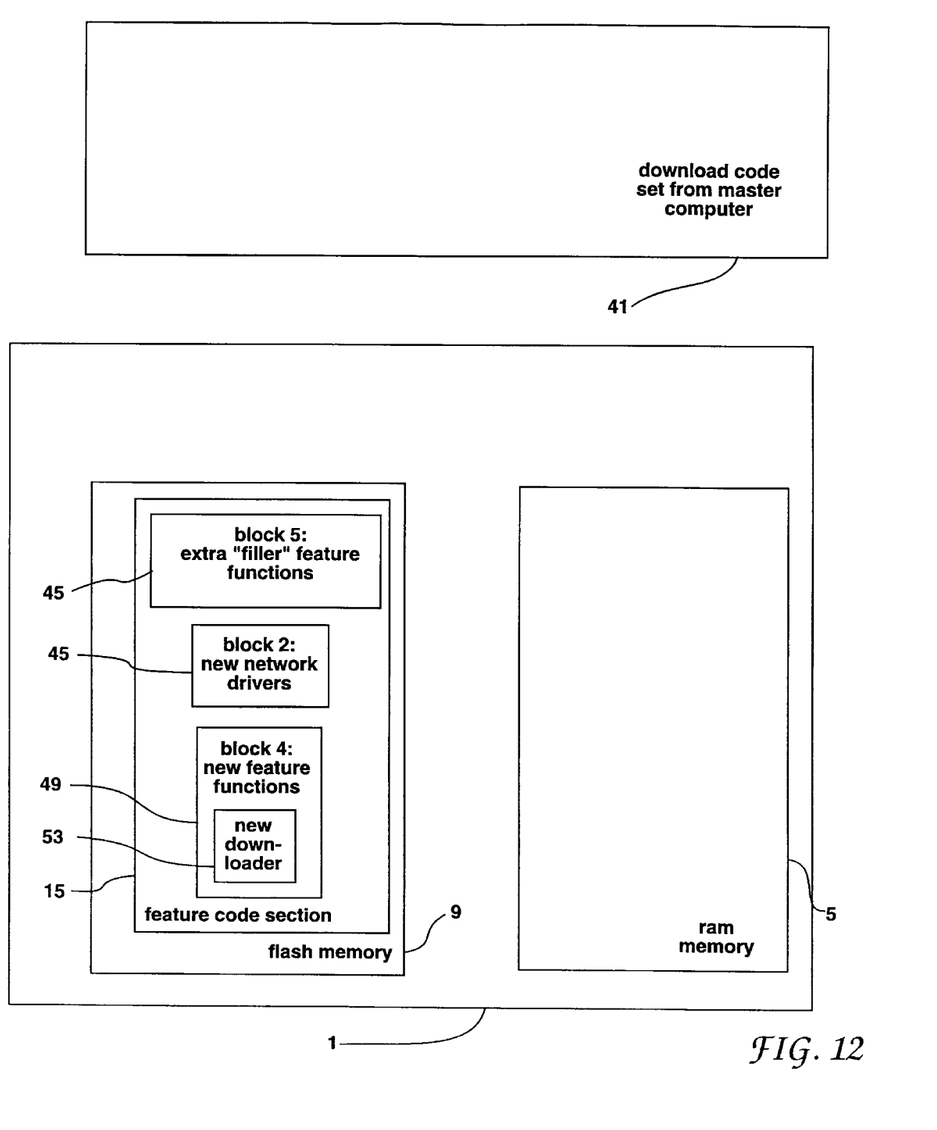
FIG. 12 is a block diagram showing the location of code blocks after completion of the optional fourth step of the download method of the present invention.

FIG. 6 shows the location of the blocks of code after this step. Referring to FIG. 7, the ram-to-flash loader 43 next executes from ram 5 and copies the new network drivers 45 and the temporary downloader 47 into flash memory 9, overwriting and thus destroying the old downloader 55 and the old feature set 57. FIG. 8 shows the location of the code after this step. Referring to FIG. 9, next, the temporary downloader 47, using the new network drivers 45, executes from flash memory 9 and copies the new features functions 49 to flash memory 9, and, optionally copies the extra "filler" feature functions 51 to ram memory 5. The extra "filler" feature functions 51 cannot be directly downloaded to flash memory 9 its ultimate destination, because the temporary downloader 47 is executing from that memory space. FIG. 10 shows the location of the code blocks after this step. The final optional step is shown in FIG. 11 and FIG. 12. An additional optimization is to recover the part of the flash memory 9 containing the temporary downloader 47 for more feature functions 51. The extra feature functions 51 are copied by the ram-to-flash loader 43 executing out of ram memory 5 into flash memory 9, overwriting and destroying the temporary downloader 47. FIG. 12 shows the final location of the code after completion of the download.

Alternatively, the temporary downloader could be executed out of volatile memory; however, such a practice increases the risk of a catastrophic failure such as a power failure corrupting the field configurable embedded computer system during a download. Under the preferred embodiment describe above, the period of vulnerability is limited to the time the ram-to-flash loader is being copied, which is a very short window of time since no network communication is involved. In the alternative embodiment, the same result can be achieved, but the window of vulnerability is increased to include the download time of the new feature set, a potentially lengthy period because of unpredictable and uncontrollable delays inherent in network communication.

Other uses and modifications will be apparent to persons of ordinary skill in the art. All such uses and modifications are intended to fall within the spirit and scope of the appended claims.

We claim:

1. A method for downloading a download code set from a master computer to a field configurable embedded computer having a persistent memory area that includes an old downloader, the method comprising:

establishing a download code set comprising a loader, new network drivers, a temporary downloader, and a new downloader;

copying the loader, new network drivers, and temporary downloader to a memory area of the field configurable embedded computer;

erasing the old downloader; and copying the new downloader to the persistent memory area.

2. The method according to claim 1, wherein the step of copying the loader, new network drivers and temporary downloader comprises causing the old downloader to copy the loader, new network drivers and temporary downloader to a memory area of the field configurable computer.

3. The method according to claim 2, wherein the step of causing the old downloader to copy the loader, new network drivers and temporary downloader comprises executing the old downloader.

4. The method according to claim 1, wherein the step of erasing the old downloader comprises causing the loader to copy the new network drivers and the temporary downloader to the persistent memory area.

5. The method according to claim 4, wherein the step of causing the loader to copy the new network drivers and the temporary downloader comprises executing the loader.

6. The method according to claim 1, wherein the step of copying the new downloader comprises causing the temporary downloader to copy the new downloader to the persistent memory area.

7. The method according to claim 6, wherein the step of causing the temporary downloader to copy the new downloader comprises executing the temporary downloader.

8. The method according to claim 1, wherein the loader comprises a RAM to flash loader.

9. A method for downloading a download code set from a master computer to a field configurable embedded computer having a persistent memory area that includes an old downloader, the method comprising:

establishing a download code set that includes a RAM to flash loader, new network drivers, a temporary downloader, a new downloader and extra feature functions;

copying the RAM to flash loader, the new network drivers, and the temporary downloader to a volatile memory area of the field configurable embedded computer;

erasing the old downloader;

copying the new downloader to the persistent memory area;

copying the extra feature functions to the volatile memory area; and overwriting the temporary downloader.

10. The method according to claim 9, wherein the step of overwriting the temporary downloader comprises copying the extra feature functions to the persistent memory area.

11. The method according to claim 10, wherein the step of copying the extra feature functions to the persistent memory area comprises executing the RAM to flash loader.

* * * * *